United States Patent

Maust, Jr. et al.

[11] 3,757,871
[45] Sept. 11, 1973

[54] MINIMUM TILLAGE AGRICULTURAL IMPLEMENT

[75] Inventors: John Edward Maust, Jr., Des Moines; Darrel Lee Honnold, Winterset, Iowa; William Wayne Jackson, Des Moines, all of Iowa

[73] Assignee: Deere & Company, Moline, Ill.

[22] Filed: Jan. 26, 1972

[21] Appl. No.: 220,797

[52] U.S. Cl. .............. 172/178, 172/455, 172/484, 172/583, 172/623, 172/640
[51] Int. Cl. .................... A01b 35/28, A01b 63/00
[58] Field of Search ................. 172/138, 140, 178, 172/198, 441, 442, 455, 484, 568, 578, 583, 593, 594, 600, 623, 657, 640

[56] References Cited
UNITED STATES PATENTS 1,685,278  9/1928  Dwyer ........................... 172/178 X
3,235,013  2/1966  Kirkpatrick .................... 172/484 X
3,502,155  3/1970  Kenney ......................... 172/455 X
3,131,775  5/1964  Long ............................ 172/583 X
3,190,366  6/1965  Johnson et al ................. 172/623 X

FOREIGN PATENTS OR APPLICATIONS 570,933  5/1924  France ........................... 172/140
344,298  11/1936  Italy ............................. 172/178
613,303  12/1960  Italy ............................. 172/178

Primary Examiner—Robert E. Pulfrey
Assistant Examiner—Eugene H. Eickholt
Attorney—H. Vincent Harsha, William A. Murray et al.

[57] ABSTRACT

A combination disk harrow and chisel plow for effectively working the soil while leaving sufficient residue on the surface to prevent soil erosion and water run-off. The implement includes an adjustment for varying the effective working depth of the disk gangs with respect to the working depth of the chisel plows.

4 Claims, 3 Drawing Figures

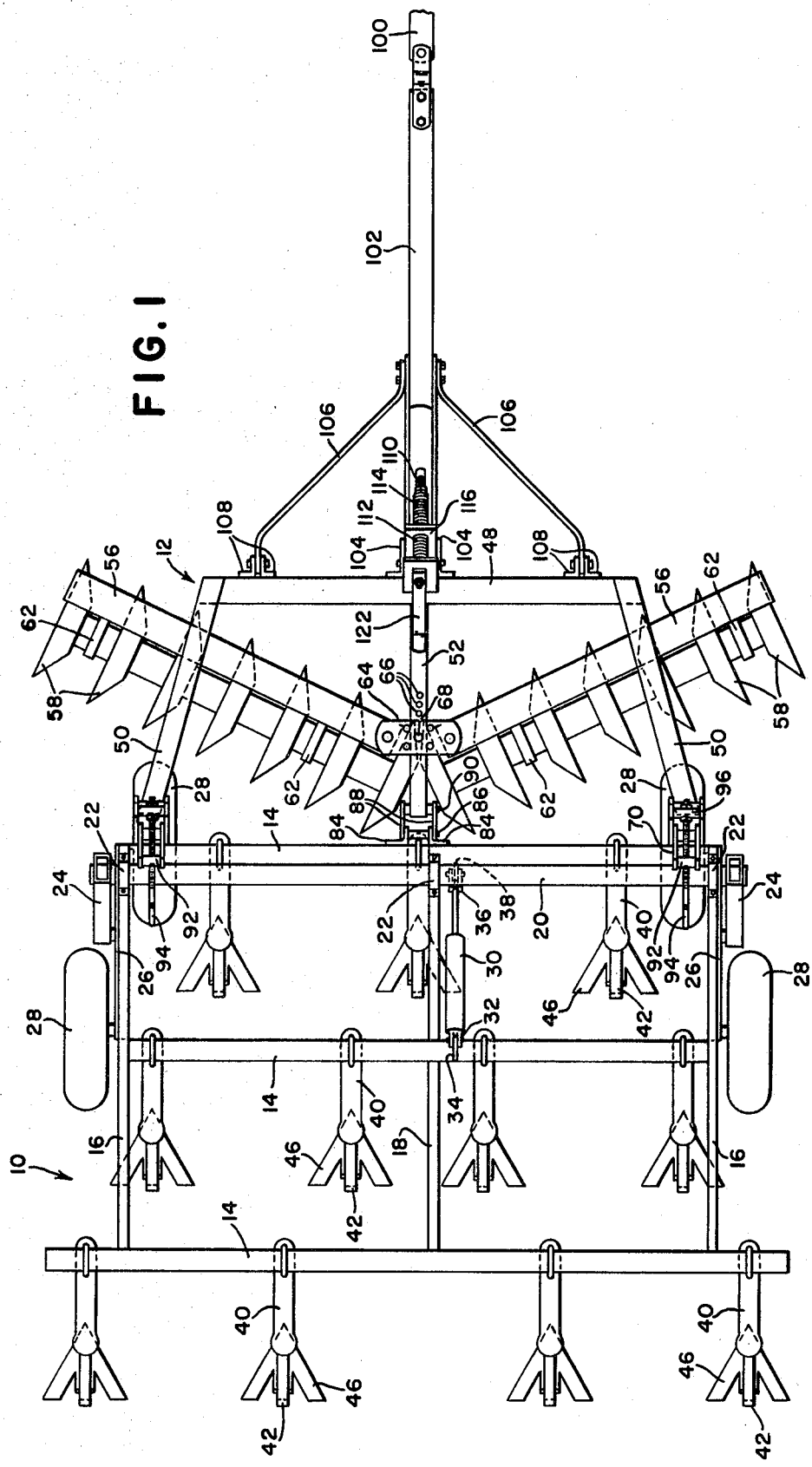

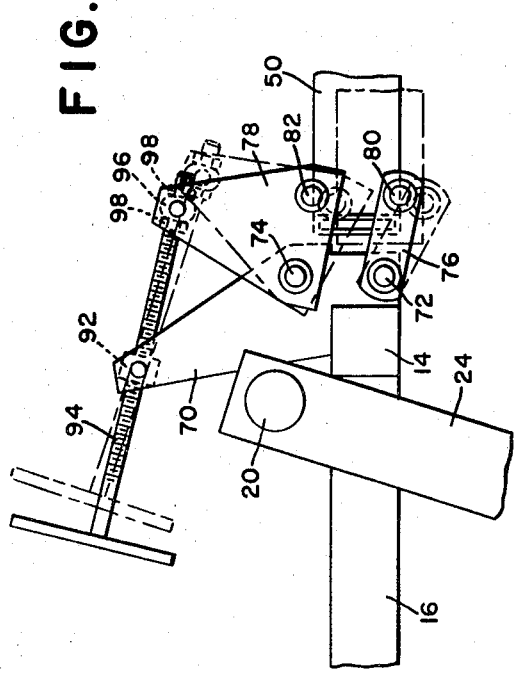
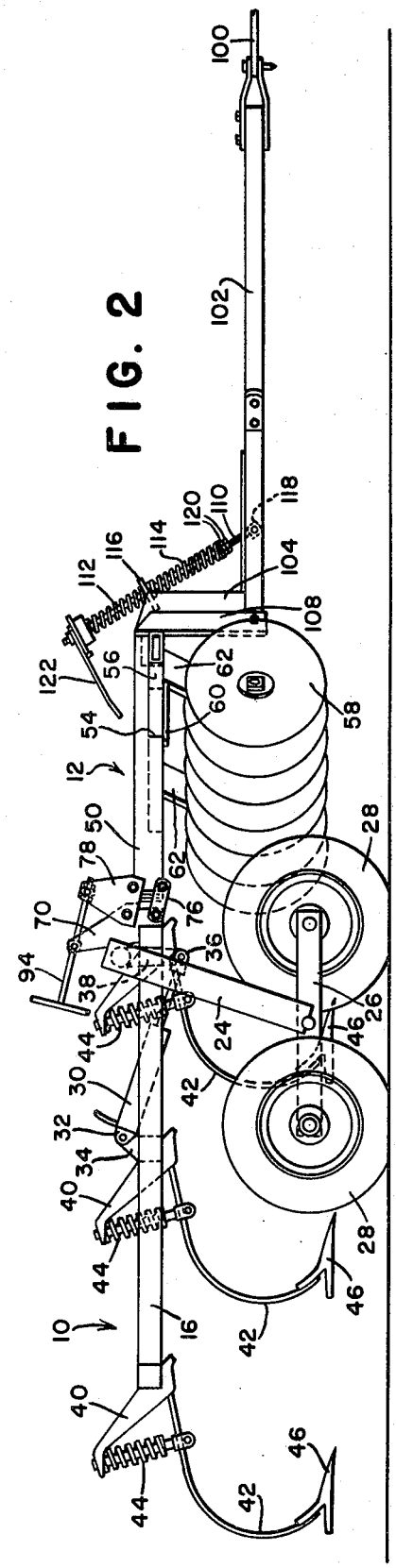

MINIMUM TILLAGE AGRICULTURAL IMPLEMENT

BACKGROUND OF THE INVENTION

The present invention relates generally to agricultural implements, and more particularly relates to a tillage implement for working the soil in preparation for planting.

In an effort to optimize yield and soil conservation, considerable attention is currently being given to the various tillage implements used to work fields in preparation for planting the next crop. Among the implements currently used are disk harrows, chisel plows and moldboard plows. However, a moldboard plow will bury so much of the trash that there will be insufficient trash left on or near the surface of the soil to prevent soil erosion. Prior to using a moldboard plow or chisel plow in corn stubble, it is often necessary to first chop the stubble so that the plows will not continuously plug due to the overabundance of cornstalk residue. When using a chisel plow in corn stubble, excess residue is left on the surface so that weed problems are increased and the likelihood of disease and insect damage is increased. A disk harrow will cover more trash than a chisel plow, but it is difficult to achieve the desired working depth.

SUMMARY OF THE INVENTION

The principal object of the present invention is to provide a minimum tillage implement which will work the ground the desired depth yet will leave sufficient residue at the surface of the soil to prevent soil erosion.

Another object of the present invention is to provide a combination disk harrow and chisel plow which can be used to till a corn stubble field without first chopping the corn stubble and which will penetrate to the desired depth.

A more specific object of the present invention is to provide a minimum tillage implement which includes distinct types of tools mounted on separate sections of the implement and in which the separate sections of the implement are relatively vertically adjustable to vary the relative working depth of the tools.

Still another object of the present invention is to provide a deep working tillage implement which is adjustable to vary the proportion of the trash which is buried.

The above objects and additional objects and advantages of the present invention will become apparent to those skilled in the art from a reading of the following detailed description when taken in conjunction with the accompanying drawings.

BRIEF DESCRIPTION OF THE DRAWINGS

In the drawings:

FIG. 1 is a top plan view of a tillage implement according to the present invention;

FIG. 2 is a side view of the implement illustrated in FIG. 1; and,

FIG. 3 is an enlarged side view of a portion of the implement illustrated in FIG. 2.

DESCRIPTION OF THE PREFERRED EMBODIMENT

Referring now to the drawings, the implement according to the present invention includes a rear frame indicated generally at 10 and a front frame indicated generally at 12. The rear frame includes a plurality of transversely extending frame members 14, a pair of longitudinally extending side frame members 16 interconnecting the transversely extending frame members 14, and longitudinally extending intermediate frame members 18 which also interconnect the transversely extending frame members 14.

A rockshaft 20 extends across the rear frame adjacent the forward portion thereof and is journaled on the longitudinally extending frame members 16 and 18 by journal blocks 22. A rock arm 24 is secured to each end of the rockshaft 20 and each rock arm has a walker arm 26 pivotally mounted at the lower end thereof. A pair of wheels 28 are mounted on the ends of each walker arm 26. A hydraulic cylinder 30 has its anchor end 32 secured to a bracket 34 on one of the transverse frame members 14 and its rod end 36 secured to a crank arm 38 on the rockshaft 20 so that upon extension and retraction of the hydraulic cylinder 30, the rear frame is vertically adjusted on the wheels 28 between a raised transport position and any one of a plurality of lowered working positions.

A plurality of mounting brackets 40 are secured in spaced positions on the transverse frame members 14 and each has a standard or a shank 42 pivotally mounted thereto. Spring assemblies 44 act between each of the mounting brackets 40 and standards 42 to hold the standards 42 in a normal working position. A plurality of earth-working tools in the form of sweeps 46 are secured to the lower end of the standards 42.

The front frame member 12 includes a forward transverse frame member 48, a pair of rearwardly divergent frame members 50 having their forward ends secured to the forward frame member 48, and a center longitudinally extending frame member 52 having its forward end secured to the forward frame member 48. Each of the side frame members 50 has a cutout portion 54 along its lower edge to receive toolbars 56 which support elongated gangs of concave soil-working disks 58. The toolbars 56 are movably retained in the cutout portions 54 by closure plates 60 which are secured to the bottom of the side frame members 50 at the opposite ends of the cutout portions 54. As is conventional, the disks 58 of each gang are mounted on a gang bolt which is in turn rotatably supported on the lower end of standards 62 which have their upper ends secured to the toolbars. The inner ends of the toolbars 56 are interconnected by a pair of connecting plates 64 (only one of which can be seen in FIG. 1). The plates 64 are positioned above and below the center frame member 52 and have their ends pivotally connected to the inner ends of the toolbars 56. The center frame member 52 is provided with a plurality of openings 66 spaced along the length thereof and the plates 64 are each provided with an opening so by inserting a pin 68 through the openings in the plates 64 and one of the openings 66, the plates 64 can be secured in any desired adjusted position along the center frame member 52 so that the angle of the toolbars 56 with respect to the direction of movement of the implement and hence the aggressiveness of the disks 58 can be varied.

To interconnect the front and rear frames 12 and 10, a pair of brackets 70 are secured to the front transverse frame member 14 of the rear frame adjacent the outer ends thereof. Each of the brackets 70 include a pair of spaced side walls which support lower and upper pivot pins 72 and 74. Pairs of lower and upper parallel links 76 and 78 have their rear ends mounted on the pivot pins 72 and 74 and have their forward ends mounted on lower and upper pivot pins 80 and 82 secured to the rear end portions of the side frame members 50 of the front frame 12. The center frame member 52 of the front frame is secured to the rear frame through a pair of right-angle brackets 84 which are secured to the front transverse frame member 14 of the rear frame and support a pair of upper and lower pivot pins 86. Upper and lower pairs of parallel links 88 have their rear ends mounted on the pins 86 and their forward ends mounted on pins 90 secured to the center frame member 52.

To control the relative vertical position of the front frame member 12 with respect to the rear frame 10, each of the brackets 70 extends above the upper pivot pins 74 carried thereby to present a generally upwardly extending arm, and each of the upper links 78 is generally of triangular shape so as to present a generally upwardly extending arm. A threaded bearing block 92 is journaled between the upper ends of the side walls of each of the brackets 70 and carries a threaded adjusting rod 94. An additional bearing block 96 is supported between the upper ends of each pair of upper links 78 and is provided with a suitable opening to rotatably receive the end of the associated adjusting rod 94. The end of the adjusting rod 94 is secured in a fixed position with respect to the bearing block 96 by lock nuts 98 so that upon rotation of the adjusting rod 94, the upper ends of the brackets 70 and upper links 78 are moved toward or away from each other to raise and lower the front frame 12 with respect to the rear frame 10 as is illustrated by the broken lines in FIG. 3. It should be noted that while the two frames are adjusted vertically to each other, the parallel links maintain the two frames in parallel planes so that only the relative working depths of the tools on the frames will be affected.

The implement is connected to the drawbar 100 of a conventional tractor by a forwardly extending hitch member 102. The rear end of the hitch member 102 is pivotally connected between the lower ends of a pair of vertically positioned elongated right-angle members 104 which have their upper ends secured to the forward frame member 48 of the front frame 12. A pair of diagonally extending brace members 106 have their forward ends secured to the hitch member 102 and their rear ends pivotally connected between the lower ends of pairs of vertically positioned elongated right-angle members 108 which have their upper ends secured to the forward frame member 48 of the front frame 12. The pivots for the brace members 106 are in alignment with the pivot for hitch member 102 so that the brace members 106 lend lateral stability to the hitch member 102 while permitting the hitch member 102 to pivot in a vertical plane with respect to the front frame member 12.

The frames 10 and 12 are maintained substantially level on the wheels when in the raised transport position by a leveling spring assembly which includes a threaded leveling rod 110 and upper and lower springs 112 and 114. The rod 110 slidably extends through an apertured plate 116 and has its lower end engaged in a threaded aperture provided in a bearing block 118 journaled between the sides of the hitch member 102. The lower spring 114 is held between the underside of the plate 116 and a pair of lock nuts 120 on the rod 110. The upper spring 112 is held between the upper surface of the plate 116 and a leveling lever 122 secured to the upper end of the rod 110.

The operation of the above-described implement is as follows. With the hitch member 102 connected to the tractor drawbar 100, and the hydraulic cylinder 30 connected to the conventional hydraulic system of the tractor, the implement is raised for transport to the field by extending the hydraulic cylinder 30. When the implement is raised, it can be leveled by rotation of the leveling rod 110. By threading the rod 110 into the block 118, the compression of the upper spring 112 is increased and the compression of the lower spring 114 is decreased so that the front end of the implement is lowered and the rear end of the implement is raised. By threading the rod 110 out of the block 118, the compression of the lower spring 114 is increased and the compression of the upper spring 112 is decreased so that the forward end of the implement is raised and the rear end of the implement is lowered.

Prior to lowering the implement in the field, the operator determines the amount of trash to be buried by adjusting the angles of the disk gangs 58. This is accomplished by removing the pin 68, sliding the plates 64 forwardly or rearwardly on the center frame member 52 to the desired position and replacing the pin 68. The operator also selects the relative working depths of the tools on the front and rear frames by rotation of the adjusting rods 94. With these adjustments made, the disk gangs on the front frame will bury the desired trash and the chisel plow sweeps 46 on the rear frames will work the earth to the desired depth. As the implement is moved over unlevel ground, the springs 112 and 114 will permit the hitch member 102 to pivot with respect to the frames 110 and 112 so that the relative vertical position of the tractor with respect to the implement will have little effect on the implement. If it is desired to transfer some of the weight on the front of the implement to the rear, it is only necessary to thread the rod further out of the block 118 so that the compression of the spring 114 is increased to exert an upward force on the forward end of the implement. Additional weight can be transferred to the front of the implement by threading the rod 110 further into the block 118.

From the foregoing description of construction and operation, it can be seen that the present invention provides a tillage implement which will work to any desired depth and which can be adjusted so as to leave sufficient trash on the surface to prevent soil erosion and also bury sufficient trash so as to minimize problems with weed control, insects, and disease.

Although only a single embodiment of the invention has been described and illustrated, various modifications within the spirit and scope of the invention will become apparent to those skilled in the art and can be made without departing from the underlying principles of the invention. Therefore, the invention should not be limited to the specific illustration and description, but only by the following claims.

We claim:

1. A minimum tillage agricultural implement comprising: a rear frame including a plurality of transverse frame bars; a plurality of chisel plow shank assemblies secured to the transverse frame bars in spaced relation to each other; a front frame including a pair of side frame members and a longitudinal center frame member; a pair of disk gang assemblies each having an outer portion mounted on one of the side frame members for pivotal movement in a plane parallel to the plane of the front frame and an inner end portion releasably and selectively secured to the center frame member in any one of a plurality of positions spaced along the length of the center frame member; means interconnecting the front and rear frames for relative vertical movement including a pair of upper and lower parallel links connected between each of the side frame members and the center frame member of the front frame and the forwardmost transverse frame member of the rear frame for pivotal movement about transverse axis; adjustable means acting between one of the front and rear frames and the parallel links connected between the side frame members of the front frame and the forwardmost transverse frame member of the rear frame for selectively establishing and maintaining the relative vertical positions of the front and rear frames; wheel means adjustably connected to the rear frame adjacent the forward portion thereof for supporting the two frames; means connected between the rear frame and the wheel means to vertically adjust the frames between a raised transport position and any one of a plurality of lowered working positions; and hitch means connected to the front of the front frame and extending forwardly therefrom for connection with a propelling vehicle, whereby the working depths of the shank assemblies and disk gangs can be simultaneously adjusted, the working depth of the shank assemblies can be varied relative to the working depth of the disk gangs, and the angles of the disk gangs can be varied to vary the aggressiveness of the disks.

2. A minimum tillage implement as set forth in claim 1 wherein the hitch means is pivotally connected to the front frame, and spring means acting between the hitch and front frame yieldably maintains the frames substantially level when in the raised transport position.

3. A minimum tillage agricultural implement as set forth in claim 2 wherein the adjustable means includes an integral upwardly extending projection on the upper link of each of the pair of links connected between the side frame members of the front frame and the forwardmost transverse frame member of the rear frame, a pair of upstanding brackets rigidly secured to the forwardmost transverse frame member of the rear frame in alignment with the upwardly extending projections, and means acting between the upper end of each of the brackets and the upper end of the associated projection to selectively move the same toward and awayfrom each other.

4. A minimum tillage agricultural implement as set forth in claim 3 wherein each of the means acting between the upper ends of each pair of associated bracket and projection includes an elongated threaded rod having one end anchored to the upper end of one of the bracket and projection and an intermediate portion extending through a threaded bearing block secured to the upper end of the other of the bracket and projection.

* * * * *